(12) United States Patent
Maire

(10) Patent No.: US 8,616,540 B2
(45) Date of Patent: Dec. 31, 2013

(54) TRAILER HITCH ATTACHMENT

(75) Inventor: Paul R. Maire, Snowmass, CO (US)

(73) Assignee: Tie Boss LLC, Minneapolis, MN (US)

( * ) Notice: Subject to any disclaimer, the term of this patent is extended or adjusted under 35 U.S.C. 154(b) by 663 days.

(21) Appl. No.: 12/620,204

(22) Filed: Nov. 17, 2009

(65) Prior Publication Data

US 2010/0156018 A1    Jun. 24, 2010

Related U.S. Application Data

(60) Provisional application No. 61/115,345, filed on Nov. 17, 2008.

(51) Int. Cl.
*B25H 1/06* (2006.01)

(52) U.S. Cl.
USPC .......................................................... 269/296

(58) Field of Classification Search
USPC .......... 269/296, 69, 902; 280/79.6; 182/181.1
See application file for complete search history.

(56) References Cited

U.S. PATENT DOCUMENTS

| | | | | | |
|---|---|---|---|---|---|
| 1,798,340 | A | * | 3/1931 | Thewes | 72/460 |
| 1,953,681 | A | * | 4/1934 | Johnson | 294/11 |
| 4,087,077 | A | * | 5/1978 | Vance | 254/94 |
| 4,225,170 | A | * | 9/1980 | Flynn | 294/11 |
| 4,241,772 | A | * | 12/1980 | Scherer | 269/289 R |
| 4,258,907 | A | * | 3/1981 | Roberts et al. | 269/69 |
| 4,362,295 | A | * | 12/1982 | Ford | 269/69 |
| 4,433,829 | A | * | 2/1984 | Grover et al. | 254/131 |
| 4,468,018 | A | * | 8/1984 | Vaizey | 269/54.5 |

(Continued)

FOREIGN PATENT DOCUMENTS

EP    0064480 A2    11/1982

OTHER PUBLICATIONS

International Search and Written Opinion, dated Jan. 21, 2010 for PCT Application No. PCT/US2009/064772 (9 pages).

(Continued)

*Primary Examiner* — Lee D Wilson
*Assistant Examiner* — Joel Crandall
(74) *Attorney, Agent, or Firm* — Fredrikson & Bryon, P.A.

(57) ABSTRACT

Embodiments of the present invention provide a jaw apparatus that is tied to a stable anchor (e.g., a vehicle) and that holds wood off the ground in a stable manner to enable cutting by a user. The jaw apparatus can include a main shaft that defines a shaft axis. The main shaft can have a first end and a second end. The first end of the main shaft can have an insertion portion that is configured to be inserted into a trailer-hitch-like receptacle (e.g., a trailer hitch receptacle). The jaw apparatus can include an indentation structure coupled to the second end of the main shaft. The indentation structure can form an indentation, which can have interior surfaces. The interior surfaces can extend upwardly and away from the main shaft. The interior surfaces can be configured to exert upward force on the piece of wood when received in the jaw apparatus. The jaw apparatus can include one or more bars coupled to the main shaft at a bar connection location between the first and second ends of the main shaft. Each of the one or more bars can extend upwardly and away from the main shaft in a direction toward the second end of the main shaft. Each of the one or more bars can have a downward facing surface configured to exert downward force on the piece of wood when received in the jaw apparatus.

18 Claims, 11 Drawing Sheets

(56) References Cited

U.S. PATENT DOCUMENTS

| | | | |
|---|---|---|---|
| 4,473,176 A * | 9/1984 | Harper | 224/569 |
| 4,641,822 A | 2/1987 | Fenerty | |
| 4,676,490 A | 6/1987 | Hopkins | |
| 4,718,652 A | 1/1988 | Liebenstein | |
| 5,247,759 A * | 9/1993 | Noriega | 43/21.2 |
| 5,472,180 A | 12/1995 | Bent | |
| 6,322,064 B1 | 11/2001 | Tallving | |
| 7,240,707 B1 * | 7/2007 | Schweitzer et al. | 144/286.5 |
| 7,356,960 B1 * | 4/2008 | Knitt | 42/94 |
| 7,472,916 B2 * | 1/2009 | Varcoe | 280/19 |

OTHER PUBLICATIONS

International Preliminary Report on Patentability, dated May 26, 2011 for PCT Application No. PCT/US2009/064772 (8 pages).

English Abstract of EP 0064480 A, published Nov. 10, 1982, 1 page.

\* cited by examiner

TRAILER HITCH ATTACHMENT

CROSS-REFERENCE TO RELATED APPLICATION

This application claims priority under 35 U.S.C. §119(e) to U.S. provisional application 61/115,345, filed Nov. 17, 2008, the entirety of which is hereby incorporated by reference herein.

BACKGROUND

Many attempts have been made to hold wood (e.g., logs, branches, dimensional lumber, etc.) securely in place for cutting. Cutting wood that is on the ground results in the saw blade contacting dirt, rocks, etc., which dulls or damages the blade. Conventional sawhorses/sawbucks attempt to hold the wood off the ground for cutting. However, counterbalancing the wood while using such sawhorses/sawbucks often becomes difficult and inefficient to cut, and can even result in the cutter losing his/her balance while cutting.

SUMMARY

Some embodiments are devised to provide stability while the wood is cut by holding a piece of wood in place so that it can easily be cut into desired lengths. Cutting a log or a branch into firewood is a common application. In the present invention, the attachment fits into a trailer hitch or other similar receptacle. The weight of the piece of wood is counterbalanced by an anchor, such as a vehicle. The vehicle anchors the bracing feature in place and it works like a jaw to hold the log in place off the ground right up to the last cut. The log can be gripped by metal grooves cut like teeth in the angle pieces where the log is positioned to lock the log in place and keep it from moving or turning. In another embodiment of the present invention, another option is to have the angle pieces bolted or welded. The bolted option would cost less to package and fit more on a retail shelf. Embodiments in which a vehicle acts as an anchor can be portable. Other anchors are possible, such as a stand that could be left by the woodpile in a yard. The freestanding stand would be done in such a way that it would counteract the weight of the wood. Different anchors can have matching receptacles (e.g., a free-standing stand can have the same receptacle as a trailer hitch) to allow one jaw apparatus to work with multiple anchors. Some embodiments can accommodate pieces of wood that are 20 feet long or longer. Many embodiments can accommodate logs/branches with 9-inch, 12-inch, or larger diameters. Many embodiments even allow the cutter to cut the last piece of firewood, which can present problems for conventional methods. In some embodiments, a cutter can lean a log/branch sideways against the jaw assembly in order to square the base end of the log/branch.

BRIEF DESCRIPTION OF FIGURES

The following figures are illustrative of particular embodiments of the present invention and therefore do not limit the scope of the invention. The figures are intended for use in conjunction with the explanations in the following detailed description. Embodiments of the present invention will hereinafter be described in conjunction with the appended photographs, wherein like numerals denote like elements.

DETAILED DESCRIPTION OF ILLUSTRATIVE EMBODIMENTS

Figure 1:
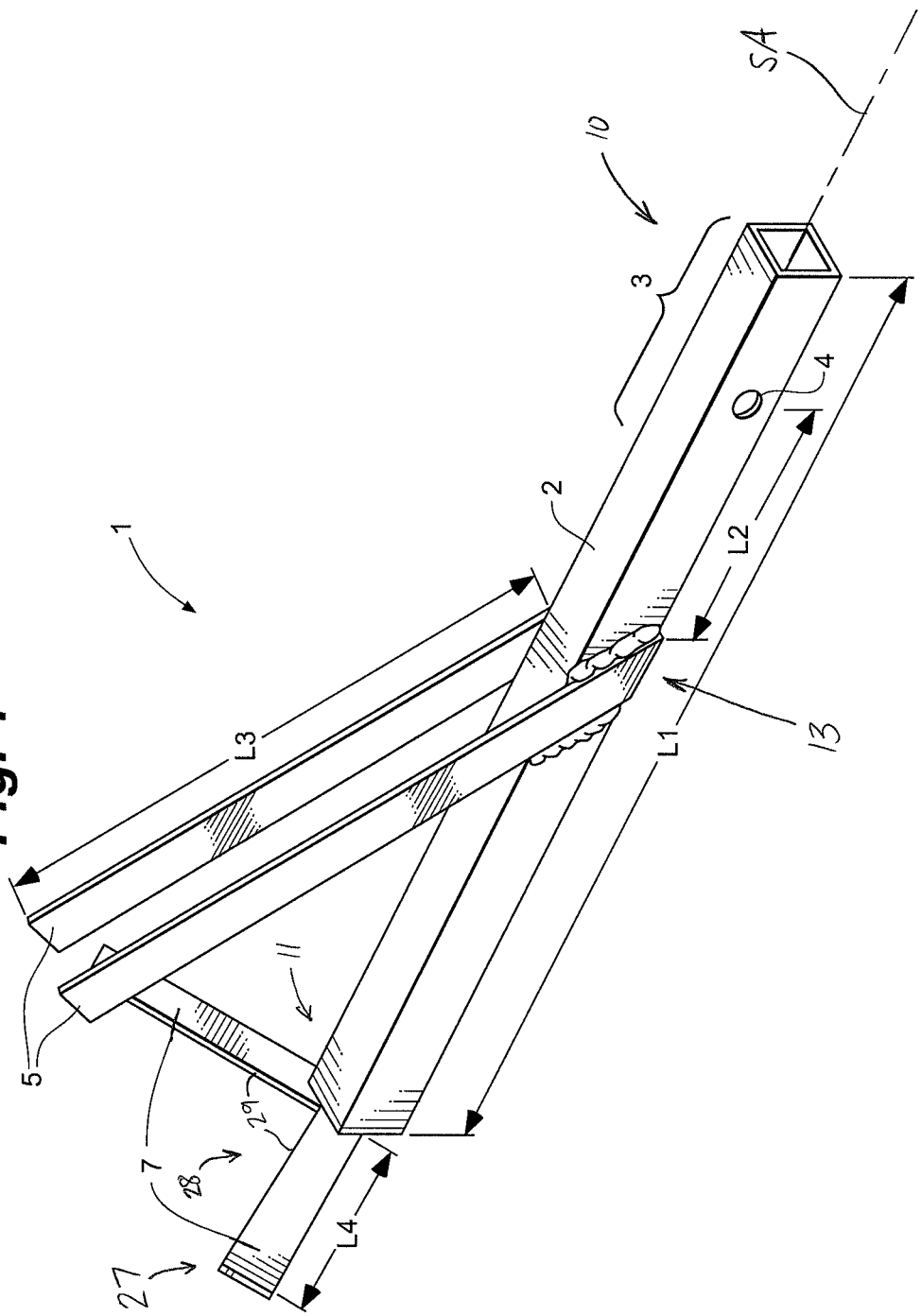
FIG. 1 shows a perspective view of an illustrative jaw apparatus according to some embodiments of the present invention.
Figure 2:
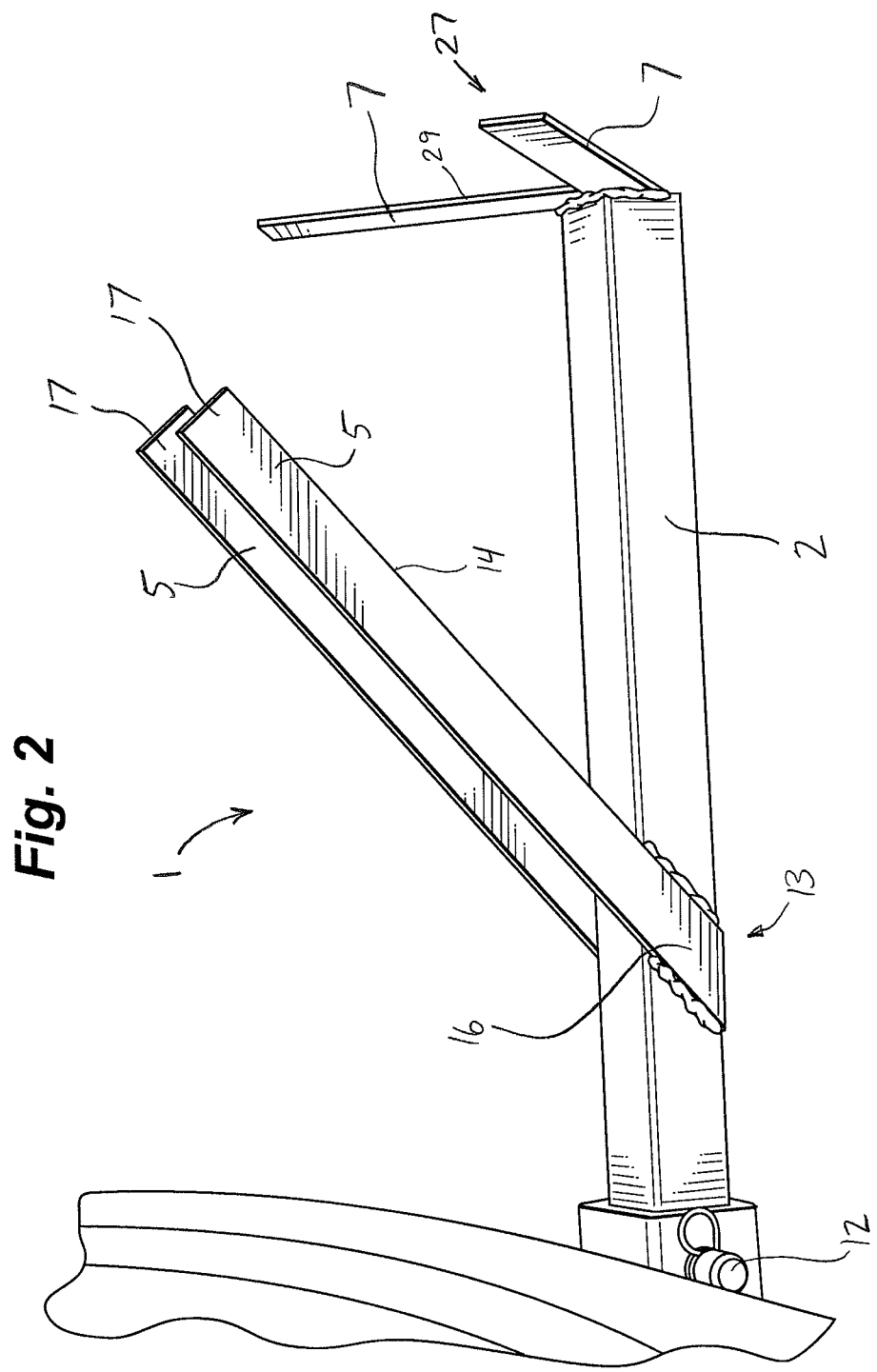
FIGS. 2 and 3 shows the jaw apparatus of FIG. 1 anchored by a vehicle.
Figure 3:
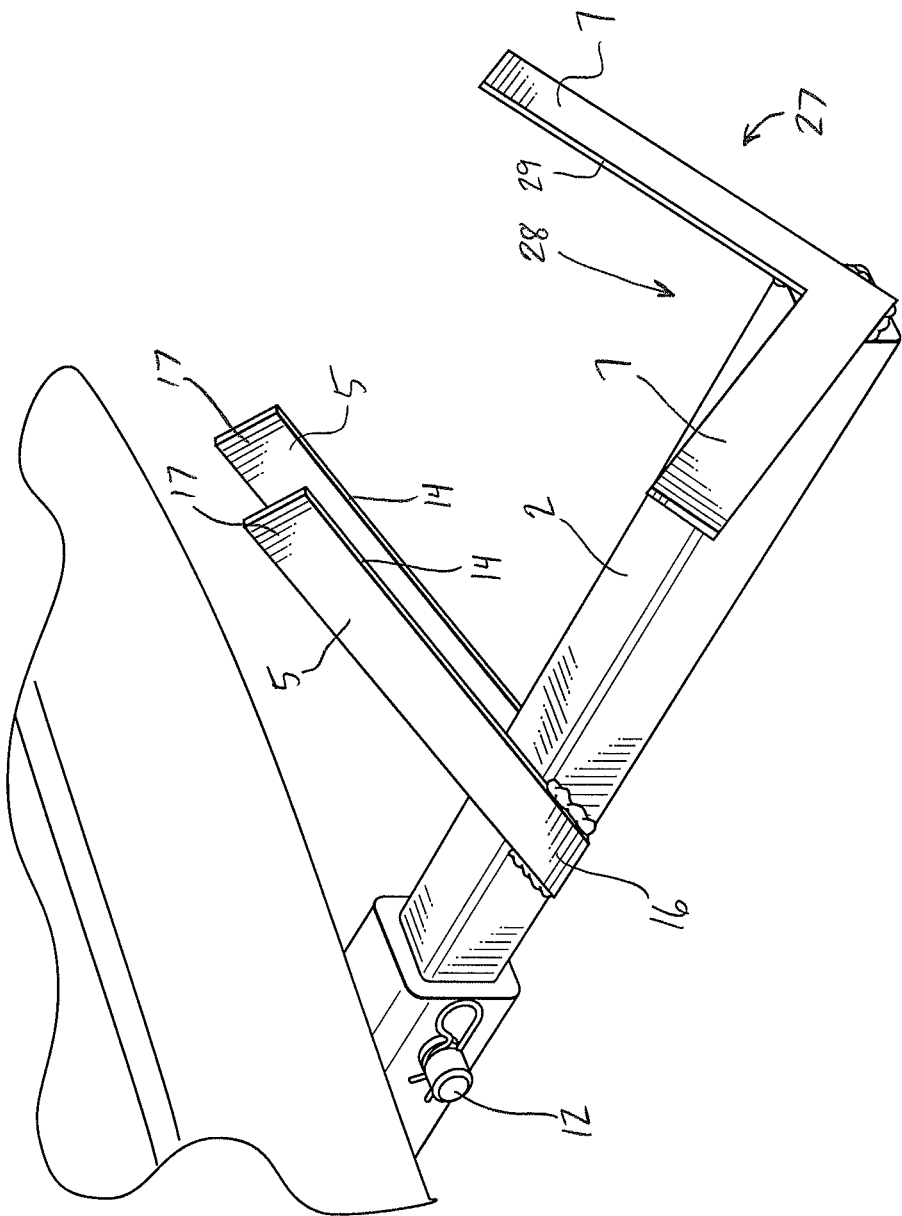
Figure 4:
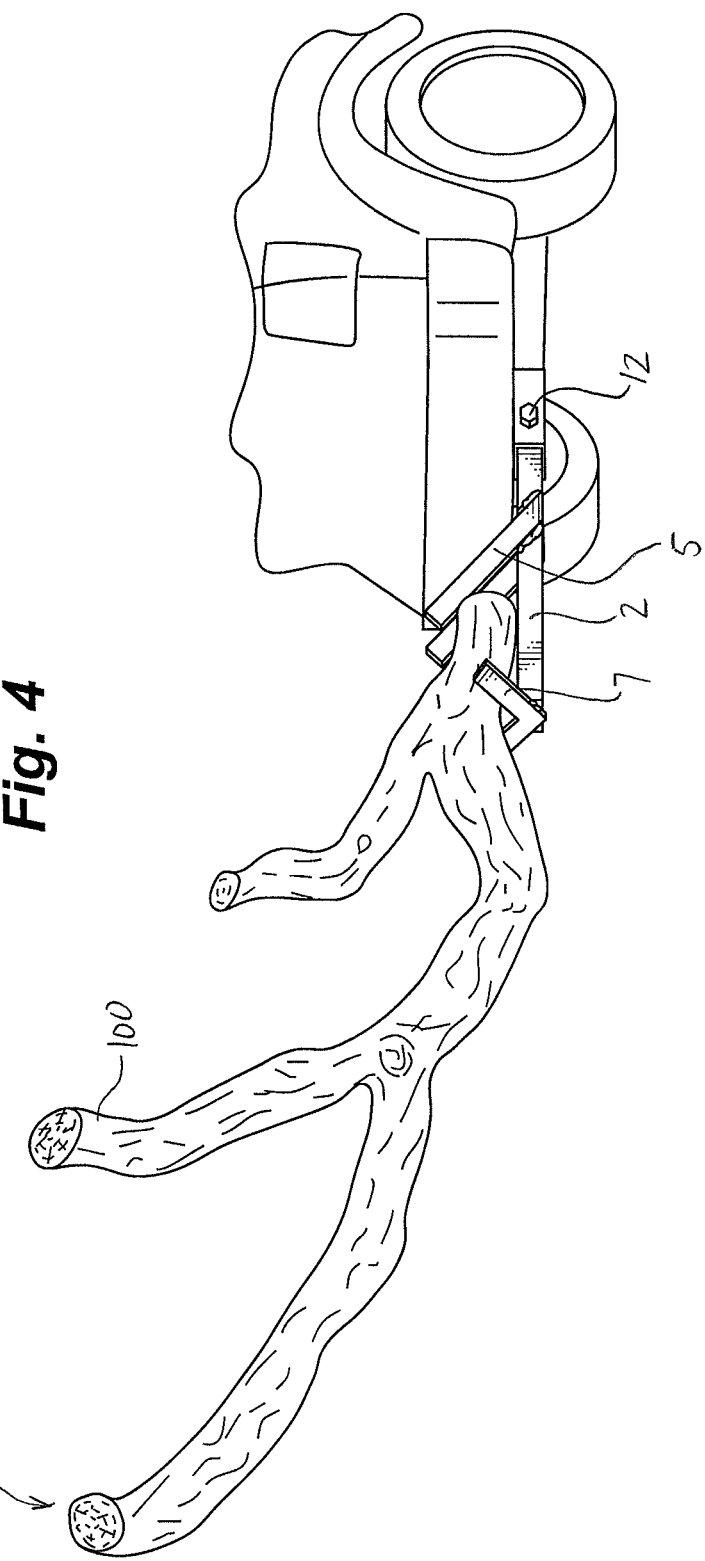
FIG. 4 shows the jaw apparatus of FIG. 1 anchored by a vehicle and holding a large branch.
Figure 5:
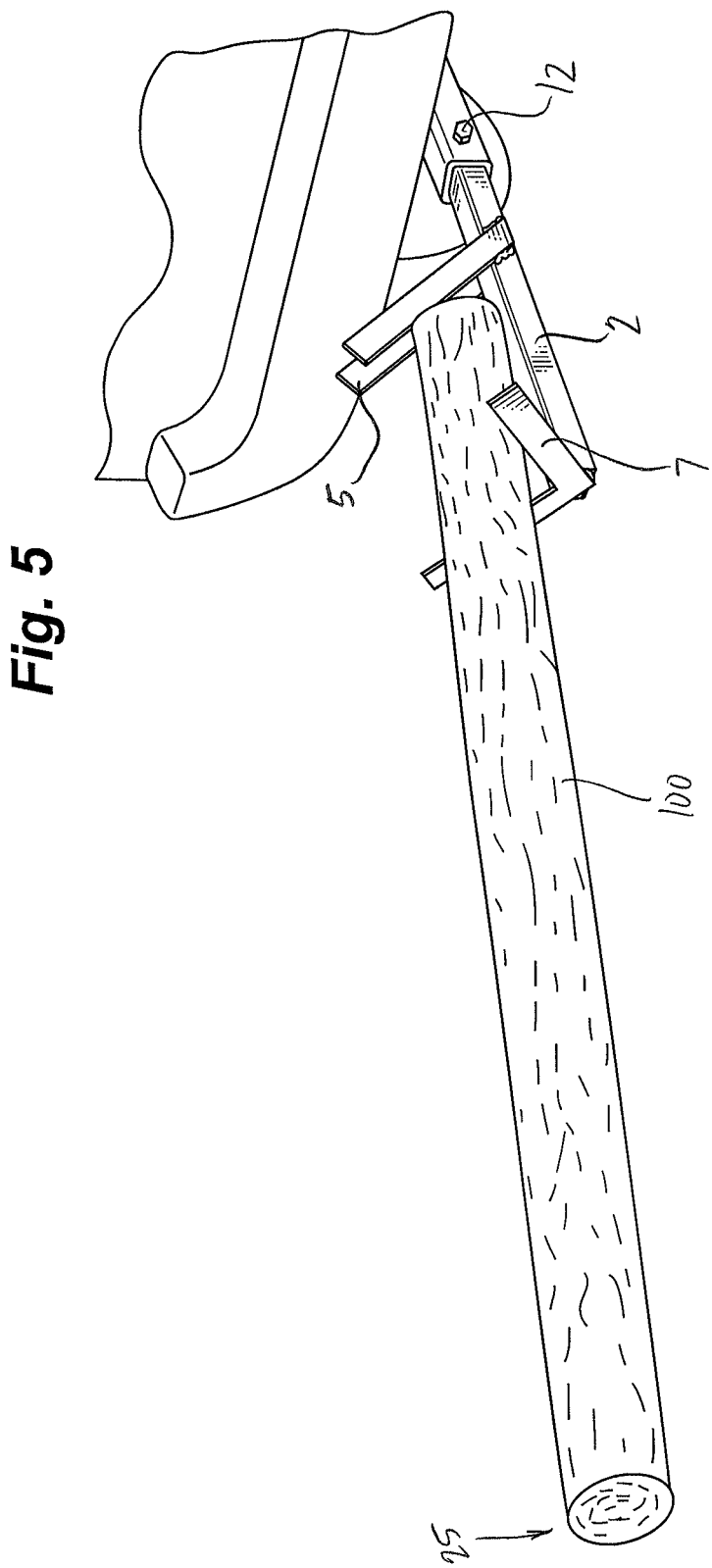
FIGS. 5 and 6 show the jaw apparatus of FIG. 1 holding a large log (e.g., a fence post).
Figure 6:
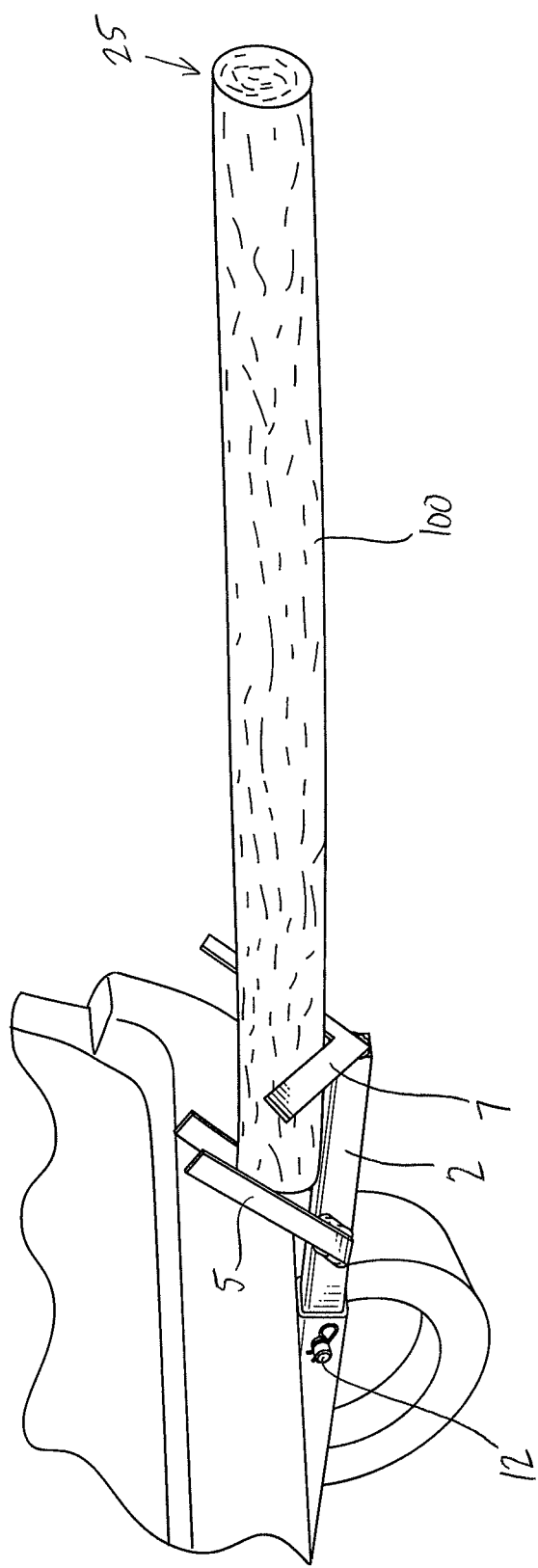
Figure 7:
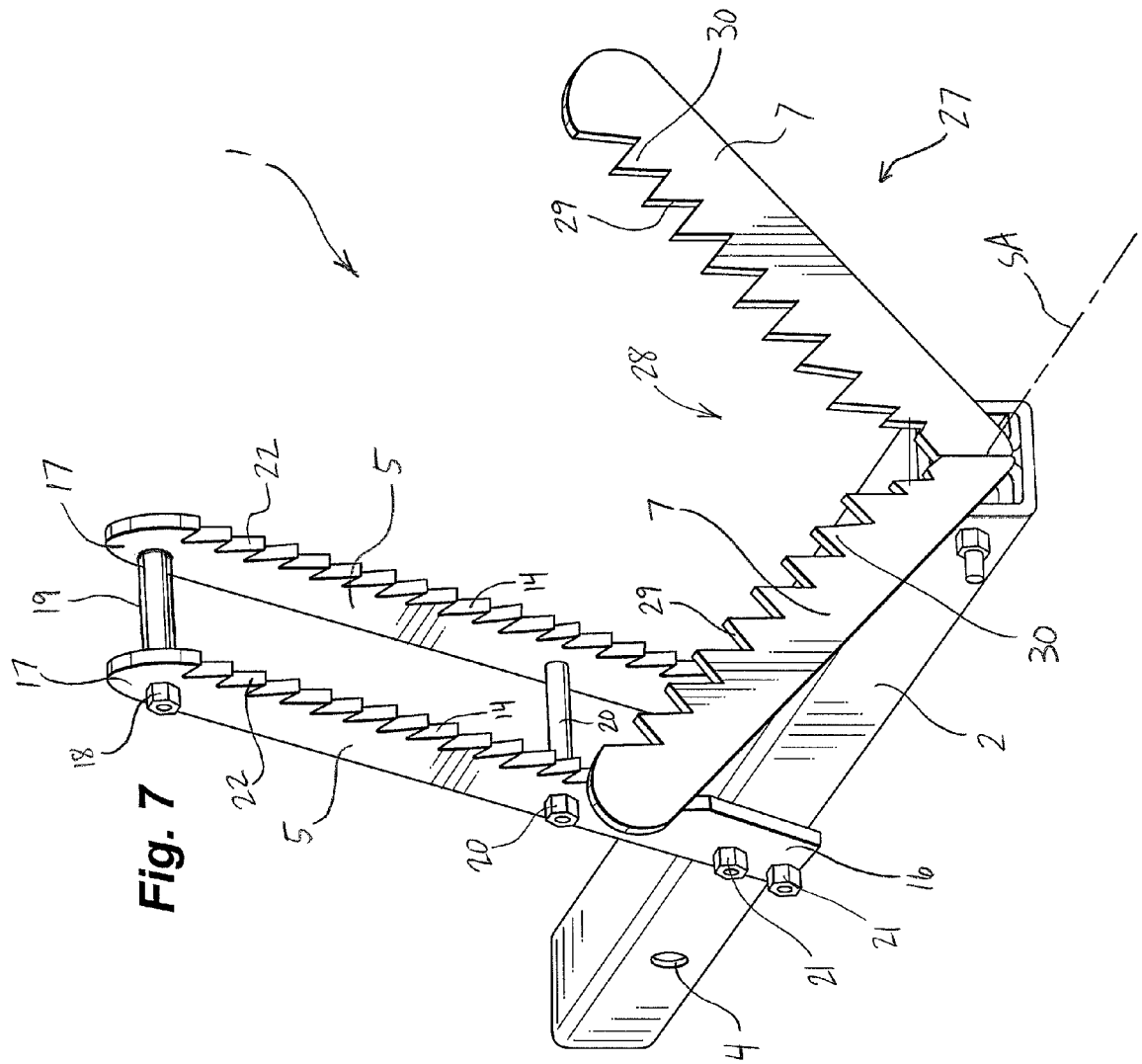
FIG. 7 shows a perspective view of an illustrative jaw apparatus according to some embodiments of the present invention.
Figure 8:
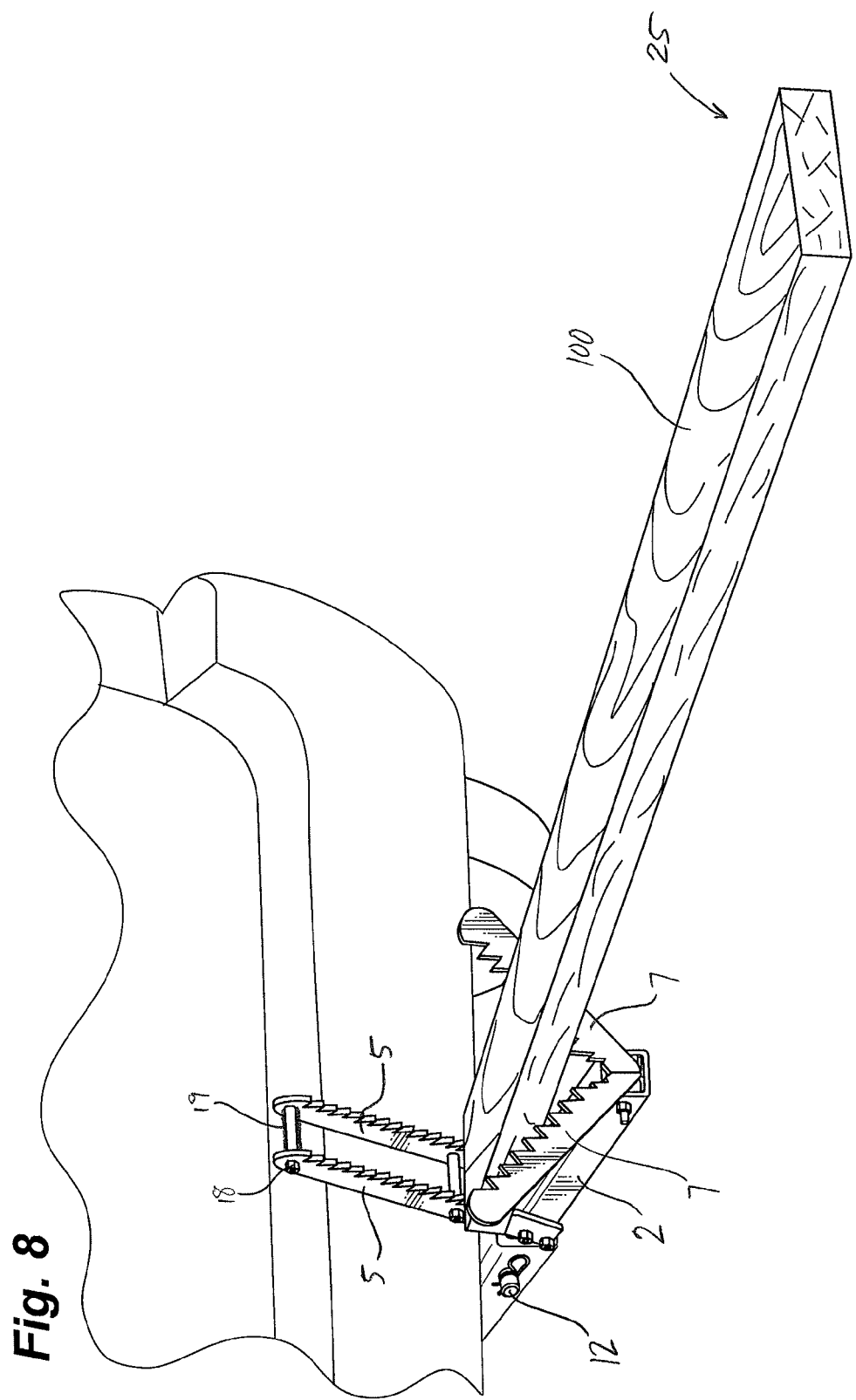
FIG. 8 shows the jaw apparatus of FIG. 7 anchored by a vehicle and holding a piece of dimensional lumber.
Figure 9:
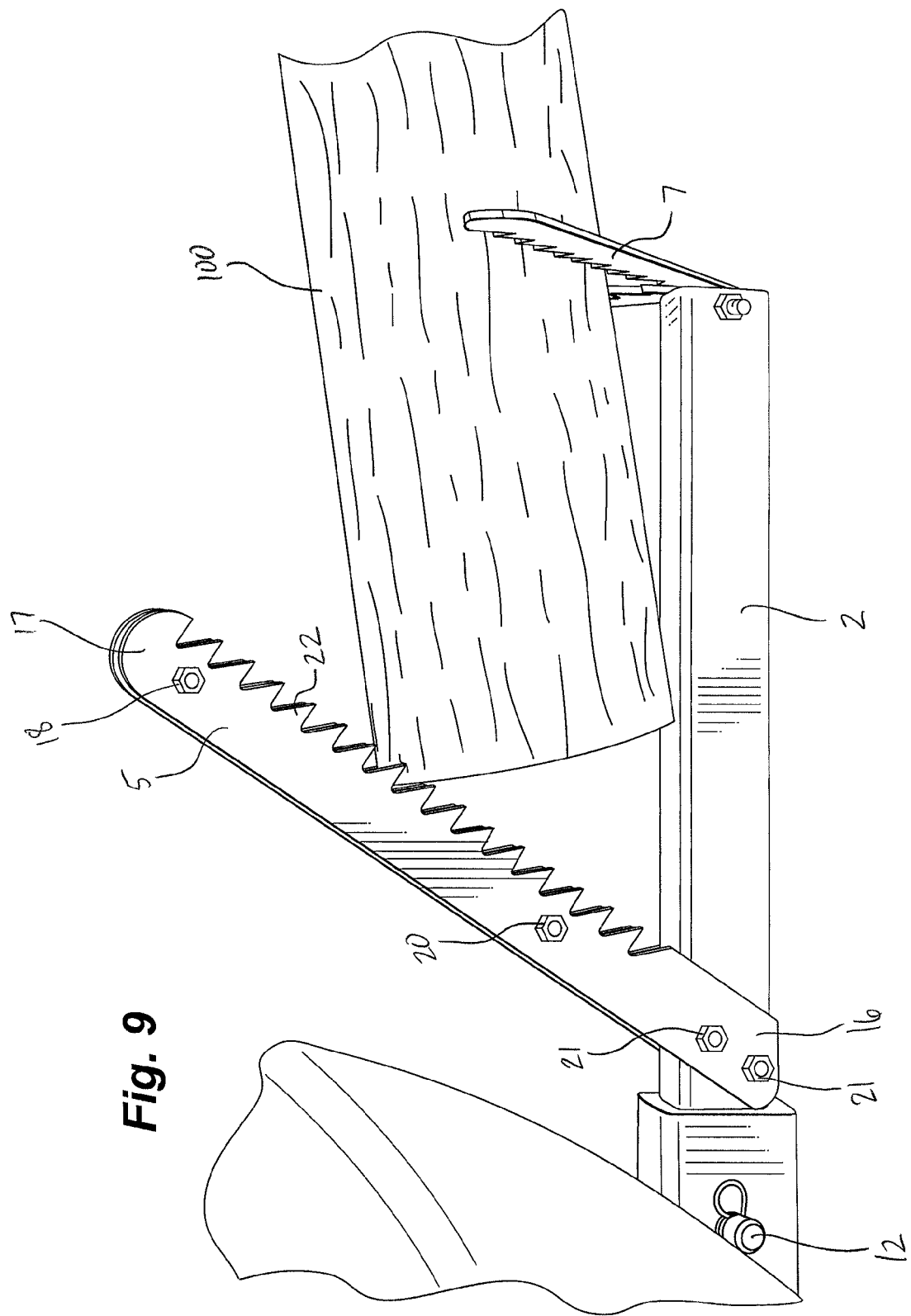
FIG. 9 shows the jaw apparatus of FIG. 7 anchored by a vehicle and holding a large log.
Figure 10:
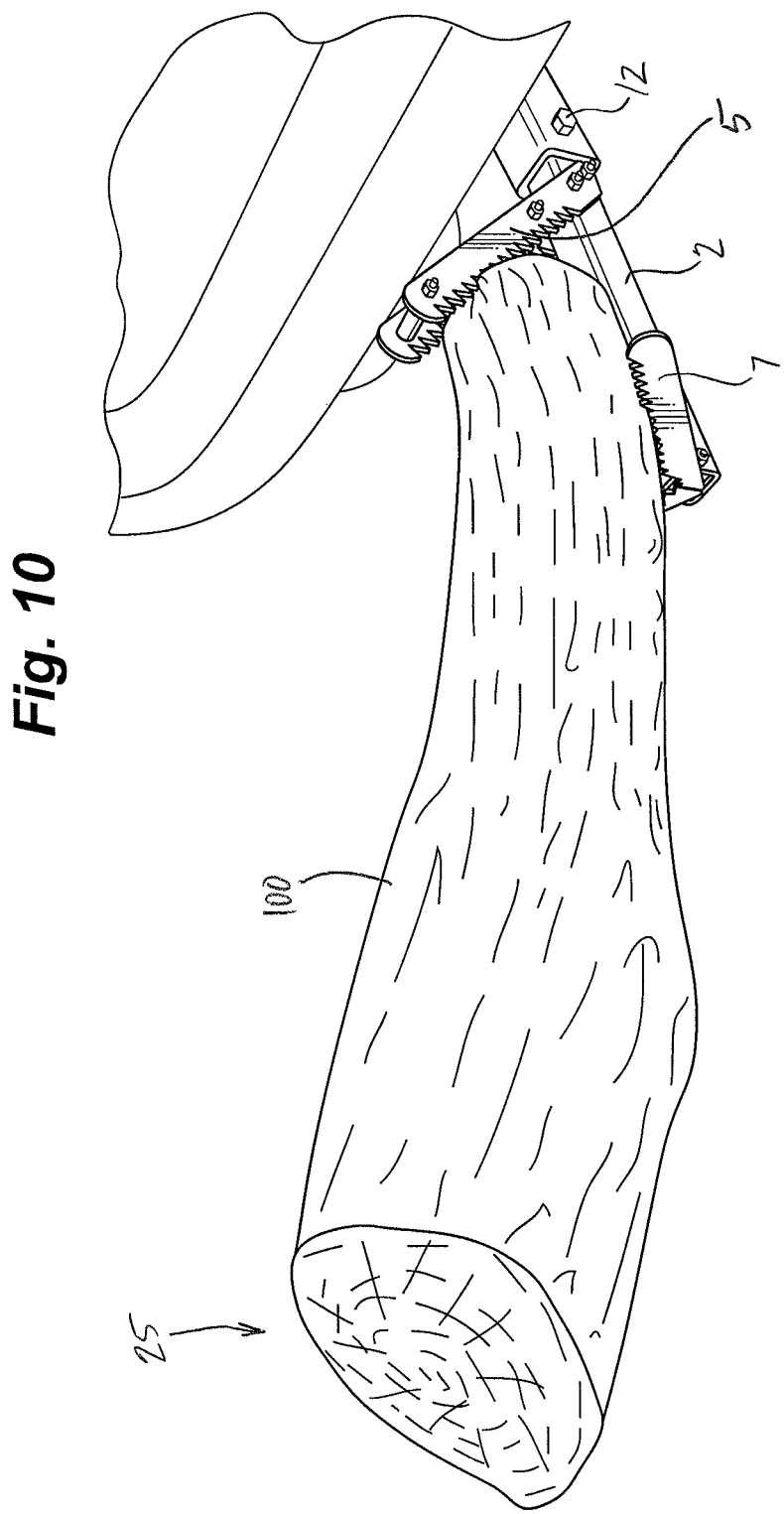
FIG. 10 shows the jaw apparatus of FIG. 7 anchored by a vehicle and holding a piece of wood.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

FIGS. 1-10 show illustrative jaw apparatuses 1. FIGS. 1-6 show one embodiment of the jaw apparatus 1, and FIGS. 7-10 show a second embodiment of the jaw apparatus 1. Unless otherwise noted herein (or unless readily apparent), characteristics of one of the jaw apparatus embodiments are likewise possessed by the other jaw apparatus. The jaw apparatus 1 can receive and hold a piece of wood 100 to assist a user in cutting the piece of wood 100. The jaw apparatus 1 includes a main shaft 2, which defines a shaft axis SA. In some embodiments, the main shaft 2 can be curved (e.g., S-shaped, curved X degrees in one direction or another, etc.). The main shaft 2 holds the other components of the jaw apparatus 1 together. Embodiments are made of metal (e.g., steel) or of a high-strength polymer or other suitable material. Embodiments made of polymer have an advantage of being manufactured with relative ease using injection molding techniques, which would also likely lead to reduced weight. The main shaft 2 of jaw apparatus 1 is a hollow square tube. Other embodiments can take a variety of shapes (e.g., a solid square tube, a solid or hollow cylinder, etc.). Many embodiments are adapted to accommodate a variety of styles of trailer hitches.

In many embodiments, the main shaft 2 of the jaw apparatus is generally straight. As compared with bent sawbucks that raise the piece of wood significantly above the plane of a vehicle's trailer hitch, a generally straight shaft can permit the piece of wood 100 to be positioned lower to the ground. Generally speaking, it is much easier to lift a heavy and/or awkward pieces of wood into the jaw apparatus 1 and secure it if the jaw apparatus 1 is lower to the ground. Additionally, cutting lower to the ground is significantly more ergonomic for the operator.

As shown, the main shaft 2 includes a first end 10 and a second end 11. The first end 10 of the main shaft 2 includes an insertion portion 3, which can be inserted into a receptacle of an anchor, such as a trailer-hitch-like receptacle (e.g., a receptacle of a trailer hitch or a receptacle that provides a similar interface). In many cases, the receptacle has a fixed depth. The insertion portion 3 includes a hole 4 that can be designed to match a corresponding hole in the receptacle. When inserted, a pin 12 can pass through the hole 4 of the jaw apparatus 1 and the hole of the receptacle to add security to the connection of the jaw apparatus 1 and the anchor. In some applications, the jaw apparatus 1 can be used without a pin 12 connecting it to the anchor. Some embodiments have additional/alternative means of securing the jaw apparatus 1 to the anchor.

The jaw apparatus 1 can include one or more bars 5. The bars 5 can be coupled to the main shaft 2 at a bar connection location 13, which can be between the first and second ends 10, 11 of the main shaft 2. Each of the one or more bars 5 can extend upwardly and away from the main shaft 2 in a direction toward the second end 11 of the main shaft 2. Each of the one or more bars 5 can have a downward facing surface 14 that is configured to exert downward force on the piece of wood 100 when received in the jaw apparatus 1.

The jaw apparatuses 1 shown include two bars 5 that are both generally straight and that extend generally parallel to one another. In many embodiments, the bars 5 extend generally parallel to the sides of the main shaft 2. Some embodiments can have a single bar that extends upwardly and away from the main shaft 2. Some embodiments can have three or more bars that extend upwardly and away from the main shaft 2. In embodiments having two bars 5, the two bars 5 can each form an angle between 15 and 75 degrees with the shaft axis SA. In preferred embodiments, the two bars 5 can each form an angle between 30 and 60 degrees with the shaft axis SA. In particularly preferred embodiments, the two bars 5 can each form an angle between 40 and 50 degrees with the shaft axis SA, with a 45-degree angle being perhaps the most preferred. In some embodiments, the angle is adjustable to better accommodate larger or smaller pieces of wood. As shown, the length of the bars 5, labeled L3, is approximately 14.5 inches. In many embodiments, the size of the main shaft 2 can determine how far the bars 5 are spaced apart. In embodiments in which the bars 5 are spaced apart by approximately the same distance as the width of the main shaft 2, the bars can significantly reduce the likelihood of the piece of wood twisting or spinning when received in the jaw apparatus 1. The bars 5 can be made of the same material as the other components discussed herein.

In some jaw apparatuses 1 having two bars 5, each bar 5 can include an attachment end 16 and a free end 17. In some such embodiments (see FIGS. 7-10), a nut-and-bolt combination 18 can connect the two bars 5 near their free ends 17. Nut-and-bolt combination 18 can inhibit the two bars 5 from moving away from one another. In some such embodiments, a spacer 19 can be carried by nut-and-bolt combination 18. The spacer 19 can contact both bars 5 to inhibit the bars 5 from moving toward one another. In preferred embodiments (see FIG. 7), the spacer 19 and nut-and-bolt combination 18 form a handle adapted to permit generally weight-balanced carrying (e.g., with one hand) of the jaw apparatus 1. In some embodiments having two bars 5, the bars 5 are spaced a distance apart from one another (e.g., two inches). Some such embodiments include a nut-and-bolt combination 20 connecting the two bars 5 near their attachment ends 16. Nut-and-bolt combination 20 can inhibit the two bars 5 from moving away from one another. In preferred embodiments, nut-and-bolt combination 20 can be configured to apply downward force on pieces of wood that are smaller than the distance between the two bars 5 (e.g., sticks having a diameter smaller than two inches or smaller than one inch or smaller than 0.5 inches). In such embodiments, nut-and-bolt combination 20 can be positioned vertically above the main shaft 2 by approximately the same distance as the distance between the two bars 5. In many instances, the operator can simply break the smaller sized pieces of wood rather than cutting them because of the fulcrum provided by the indentation structure 27.

The bars 5 can be fastened to the main shaft 2 in a number of ways. In the jaw apparatus 1 of FIGS. 1-6, the bars 5 are welded to the main shaft 2. In the jaw apparatus of FIGS. 7-10, nut-and-bolt combinations 21 (e.g., two or three) or other fasteners can be used.

The downward facing surfaces 14 of the bars can have a variety of configurations. The jaw apparatus 1 of FIGS. 1-6 has downward facing surfaces 14 that are relatively smooth. Such a jaw apparatus 1 can provide quite beneficial functionality. In preferred jaw apparatuses, such as that of FIGS. 7-10, the downward facing surfaces 14 of the bars 5 can have teeth 22 or other roughened texture to enable better gripping of the wood 100. Downward facing surfaces 14 according to many embodiments of the present invention can be better suited to avoid collecting grit and sawdust during cutting, which can improve the stability of the piece of wood.

The distance between the hole 4 and where the bars 5 and main shaft 2 meet is labeled L2. In many embodiments, L2 is designed to be long enough to allow safe cutting when leaning a log/branch against the jaw assembly 1 to square the base end while keeping it off the ground. In many embodiments, L2 is designed to be short enough to not unduly increase the likelihood of the main shaft 2 bending. In FIGS. 1-6, L2 is approximately 6.5 inches. Another way to describe this characteristic is in terms of the distance between the bar connection location 13 and the insertion portion 3. In FIGS. 7-10, this distance is essentially zero, meaning that the bars 5 connect to the main shaft 2 in close proximity to, or right next to, the receptacle. In FIGS. 1-6, this distance is greater than essentially zero. Minimizing this distance can be beneficial in that it can decrease the moment force exerted by the free end 25 of the piece of wood 100, decrease material costs, decrease the overall weight of the jaw apparatus 1, and so on. Some embodiments involve increasing this distance to avoid interference with a pickup truck's tailgate when in the down position. In some such embodiments, the jaw apparatus 1 can be tied to the tailgate to provide additional upward force to the jaw apparatus 1.

Jaw apparatuses according to the present invention can come in a variety of lengths. The embodiment of FIGS. 1-6 can be approximately 28 inches. The embodiment of FIGS. 7-10 can be approximately 24 inches. Jaw apparatuses can be made longer or shorter, depending on the particular application and the desired outcome.

The jaw apparatus 1 can include an indentation structure 27. The indentation structure 27 can be coupled to the second end 11 of the main shaft 2. The indentation structure 27 can form an indentation 28 having interior surfaces 29. The interior surfaces 29 can extend upwardly and away from the main shaft 2. The indentation structure's interior surfaces 29 can be configured to exert upward force on the piece of wood 100 when received in the jaw apparatus 1.

The jaw apparatus 1 shown includes arms 7 that extend upwardly and away from the main shaft 2 to form a V-shaped indentation. In many embodiments, the arms 7 extend generally parallel to the end of the main shaft 2 and generally perpendicular to the axis of the main shaft 2. As shown, the arms 7 form a 90-degree angle with each other. In many embodiments, the indentation structure 27 extends in a generally radial direction relative to the shaft axis SA. In some embodiments, the angle is adjustable to better accommodate larger or smaller branches/logs. As shown, the length of the arms 7, labeled L4, is approximately 8 inches. The arms 7 can be attached to the main shaft 2 in a number of ways, including any of the ways discussed above in connection with the bars 5 and/or can be made of the same material as the other components discussed herein. Similar to the bars 5, the arms 7 can include roughened upward facing surfaces to enable better gripping of logs/branches. In some preferred embodiments, such as that of FIGS. 7-10, the interior surfaces 29 of the indentation 28 include teeth 30 configured to grip the piece of wood 100 when received in the jaw apparatus 1.

In use, a cutter can lean a base end of the piece of wood 100 into the indentation 28 of the indentation structure 27. The cutter can align the piece of wood 100 along the shaft axis SA. The cutter can then lift the piece of wood such that the base end is wedged into the space between the main shaft 2 and the bars 5 (under the bars) and the free end 25 extends away from the anchor.

In this way, the piece of wood 100 can be stabilized. The main shaft 2 and the indentation structure 27 can provide an upward force. The bars 5 can provide a corresponding downward force. The indentation structure 27 and the bars 5 can provide balancing side-to-side forces. The moment force exerted by the free end 25 of the piece of wood 100 can be counterbalanced by the anchor (e.g., the vehicle).

In particularly preferred embodiments, the jaw apparatus 1 can receive and hold pieces of wood having vertical dimensions between 1 and 10 inches (or more, such as 12 inches, 15 inches, 20 inches, and so on, depending on the structure and the particular application) without adjustment of the one or more bars 5. The downwardly facing surface(s) 14 of the one or more bars 5 can form a continuously variable gripper. Pieces of wood with smaller vertical dimensions can engage the downwardly facing surfaces 14 closer to the first end 10 of the main shaft 2, while pieces of wood with larger vertical dimensions can engage the downwardly facing surfaces 14 closer to the second end 11 of the main shaft 2. In most embodiments, the user need not adjust the bars 5 or any other component of the jaw apparatus 1 to secure the piece of wood in the jaw apparatus 1. In many embodiments, the lowermost portions of the indentation structure 27 and the one or more arms 5 are positioned near the main shaft 2 and/or generally in the same plane as the main shaft 2, which can aid the jaw apparatus 1 in providing the continuously variable gripping surface.

In many embodiments, the jaw apparatus 1 can receive and hold a piece of wood 100 according to what, in the cutter's judgment, is the optimal position. Different pieces of wood have different requirements regarding optimal positioning in the jaw apparatus 1. This is especially the case for pieces of wood that are curved/bent and/or that still have attached branches (see FIG. 4). As noted elsewhere herein, the jaw apparatuses 1 shown in FIGS. 1-10 (especially the jaw apparatus of FIGS. 7-10) can allow the user to position the piece of wood 100 in the jaw apparatus 1 without the piece of wood twisting or spinning. The user can position the piece of wood 100 so that he/she has the best and safest angle for cutting. If the piece of wood 100 is permitted to twist or spin, gravity often dictates the position of the piece of wood 100, with branches, etc. causing the piece of wood to move from what the cutter deems the optimal position. In some embodiments, the jaw apparatus 1 can receive and hold a piece of wood 100 irrespective of how the piece of wood 100 is cut on its butt end. The jaw apparatus 1 can accommodate various pieces of wood 100 with variously cut butt ends without the user first having to square the butt end. This flexibility can make cutting significantly easier, particularly when multiple pieces of wood are being cut in a single outing.

With the piece of wood 100 stabilized in a secure cantilevered position in the jaw apparatus 1, a cutter can start at the free end 25 and cut suitably sized pieces of wood (e.g., firewood). He/she can continue doing so until the piece of wood 100 is effectively twice the desired cut-length. Even at that point, the jaw apparatus 1 can secure the piece of wood 100, thereby allowing the cutter to cut the final piece into two pieces of wood without concern of a saw kickback or of the log/branch folding in on itself and pinching the saw blade.

Some embodiments of the present invention include a method of cutting a piece of wood 100. The method can include providing a jaw apparatus 1, such as those discussed elsewhere herein. The method can include inserting the insertion portion 3 of the jaw apparatus 1 into a trailer-hitch-like receptacle that is affixed to an anchor. The method can include securing the piece of wood 100 in the jaw apparatus 1. Securing the piece of wood 100 in the jaw apparatus 1 can involve the interior surfaces 29 of the indentation structure's indentation 28 exerting upward force on the piece of wood 100. Securing the piece of wood 100 in the jaw apparatus can involve a downward facing surface 14 of each of the one or more bars 5 exerting downward force on the piece of wood 100. Securing the piece of wood 100 in the jaw apparatus 1 can involve a free end 25 of the piece of wood 100 extending beyond the second end 11 of the main shaft 2. The method can include cutting the piece of wood 100 between the free end 25 of the piece of wood 100 and the second end 11 of the main shaft 2.

Methods according to the present invention can include one or more of the following features. In many embodiments, the piece of wood 100 is a piece of dimensional lumber. In many embodiments, the trailer-hitch-like receptacle is a trailer hitch receptacle and the anchor is a vehicle. In many embodiments, the one or more bars 5 of the jaw apparatus 1 comprise two bars 5 that are both generally straight and that extend generally parallel to one another.

In some preferred methods, each bar 5 includes an attachment end 16 and a free end 17. In many such methods, the jaw apparatus 1 includes a nut-and-bolt combination 18 connecting the two bars 5 near their free ends 17 (see FIGS. 7-10). In many such methods, the jaw apparatus 1 includes a spacer 19 carried by the nut-and-bolt combination 18. As noted, the spacer 19 can contact both bars 5 to inhibit the bars 5 from moving toward one another, while nut-and-bolt combination 18 can inhibit the two bars 5 from moving away from one another. Some particularly preferred methods include carrying the jaw apparatus 1 by the spacer 19 and nut-and-bolt combination 18 (e.g., from one place to another) before inserting the insertion portion 3 of the jaw apparatus 1 into the trailer-hitch-like receptacle. Carrying the jaw apparatus 1 by the spacer and nut-and-bolt combination 18 can significantly assist in inserting the insertion portion 3 of the jaw apparatus 1 into the receptacle. For example, a user can carry the jaw apparatus 1 with one hand and guide the insertion portion 3 into the receptacle with the other hand.

Figure 11:
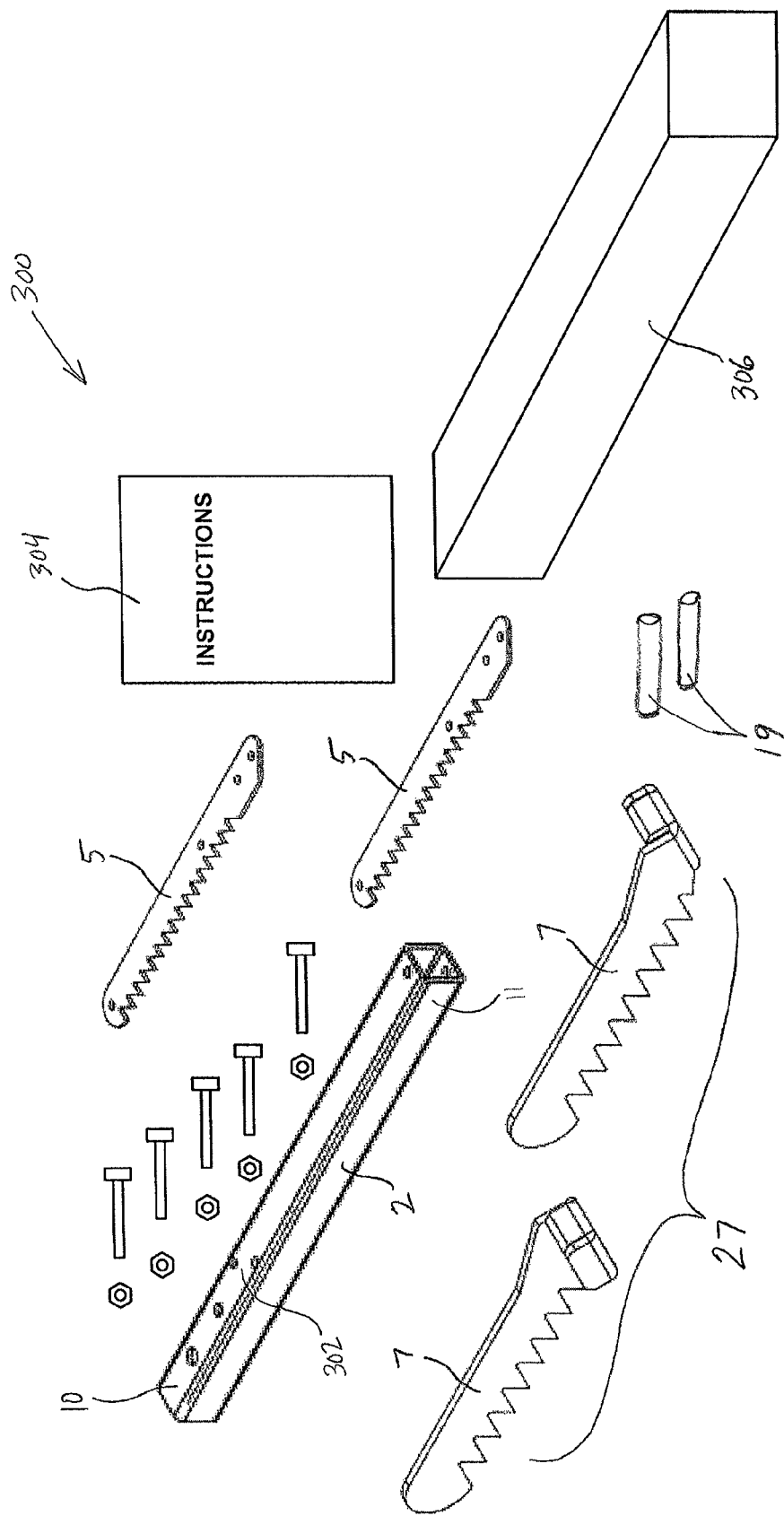
FIG. 11 shows an illustrative kit for assembling a jaw apparatus according to some embodiments of the present invention.

In some embodiments, the jaw apparatus 1 can be shipped in an unassembled form. This can enable shipment in a smaller package, as well as consuming minimal shelf space in a retail setting. In such embodiments, the jaw apparatus 1 can be easily assembled after shipment. FIG. 11 shows a kit 300 for assembling a jaw apparatus 1 that is adapted to receive and hold a piece of wood to assist a user in cutting the piece of wood. The kit 300 of FIG. 11 shows the jaw apparatus of FIGS. 7-10 in knock-down form. Referring again to FIG. 11, the kit 300 can include the main shaft 2 discussed elsewhere herein. In the kit 300, the indentation structure 27 can be adapted to be coupled to the second end 11 of the main shaft 2 such that, when so coupled, it possesses some or all of the characteristics discussed elsewhere herein. Similarly, in the kit 300, the one or more bars 5 can be adapted to be coupled to the main shaft 2 at an bar connection location 302 between the first and second ends 10, 11 of the main shaft 2 such that, when so coupled, each of the one or more bars 5 possesses some or all of the characteristics discussed elsewhere herein. The kit 300 can additionally include instructions 304 for coupling the indentation structure 27 and the one or more bars 5 to the main shaft 2 to form the jaw apparatus. As shown, the kit 300 can include nut-and-bolt combinations and spacers 19. Two spacers 19 are shown to indicate that one spacer 19 can be carried by an upper nut-and-bolt combination (e.g., nut-and-bolt combination 18 of FIGS. 7-10) and another spacer 19 can be carried by a lower nut-and-bolt combination (e.g., nut-and-bolt combination 20 of FIGS. 7-10). In many embodiments, the spacer 19 carried by the lower nut-and-bolt combination can function in a similar manner as the spacer 19 carried by the upper nut-and-bolt combination.

Kit embodiments according to the present invention can involve provide a variety of advantages. One of the chief advantages of such kits is their relatively small size. Providing the jaw apparatus in knock-down form can significantly reduce shipping costs, conserve retail space, and provide several additional advantages. Some kits can include a package 306 for enclosing the main shaft 2, the indentation structure 27, the one or more bars 5, and the instructions 304. In many embodiments, the package 306 is smaller than 350 cubic inches. In some embodiments, the package 306 is smaller, such as smaller than 325 cubic inches, smaller than 300 cubic inches, smaller than 275 cubic inches, smaller than 250 cubic inches, smaller than 225 cubic inches, smaller than 200 cubic inches, smaller than 190 cubic inches, smaller than 185 cubic inches, etc. In some embodiments, the main shaft, the indentation structure, the one or more bars, and the instructions weigh less than 25 pounds combined. In some embodiments, the main shaft 2, the indentation structure 27, the one or more bars 5, and the instructions 304 combine to weigh even less, such as less than 20 pounds, less than 18 pounds, less than 16 pounds, less than 14 pounds, etc.

The knocked-down jaw apparatus 1 can fit into the package 306 in a variety of ways. In a preferred way, fasteners (e.g., nuts, bolts) and spacers (if any) can be placed in a bag, which can be inserted into the interior of the main shaft 2 (if the main shaft is a hollow tube). One of the two arms 7 can slide into the first end to of the main shaft 2, while the other of the two arms 7 slides into the second end 11 of the main shaft 2, with the bent ends of the arms 7 facing out of the main shaft 2. The two bars 5 can lay flush alongside the main shaft 2, and plastic wrap can be wrapped around the bars 5 and the main shaft 2. The instructions 304 can either be wrapped around the main shaft 2 before the bars 5 are in place or fit into the main shaft 2 with the other components. When packaged in this manner, the entire package 306 can be less than 185 cubic inches.

A knocked down jaw apparatus 1 can be assembled in a variety of ways. In a preferred way, the nut-and-bolt combinations and the spacers 19 can be loosely set in place to connect the two bars 5. The two bars 5 can be aligned with the main shaft 2 such that the bars 5 are facing the second end 11 of the main shaft 2. Two nut-and-bolt combinations can loosely couple the bars 5 to the main shaft 2. The nut-and-bolt combination near the free end of the bars 5 can be tightened first, with the spacer 19 preventing the nut-and-bolt combination from being over-tightened. Then the two nut-and-bolt combinations coupling the bars 5 to the main shaft 2 can be tightened, followed by tightening the nut-and-bolt combination near the attachment end of the bars 5 (where a spacer 19 can prevent over-tightening). The two arms 7 can be aligned with the interior surfaces (with the teeth) facing upwardly, and the bent ends of the arms 7 can be inserted into the main shaft 2. A nut-and-bolt combination can pass through the main shaft 2 and through the bent ends of the arms 7 and can be tightened to secure the arms 7 to the main shaft 2.

The sizes and shapes of the various components of the jaw apparatus 1 can be modified to accommodate a variety of logs/branches. The lengths, thicknesses, angles, spacings, materials, etc. of the parts can be adjusted, depending on the particular application.

In the foregoing detailed description, the invention has been described with reference to specific embodiments. However, it may be appreciated that various modifications and changes can be made without departing from the scope of the invention as set forth in the appended claims. Thus, some of the features of preferred embodiments described herein are not necessarily included in preferred embodiments of the invention which are intended for alternative uses.

What is claimed is:

1. A jaw apparatus for receiving and holding a piece of wood to assist a user in cutting the piece of wood, the jaw apparatus comprising:
    (a) a generally straight main shaft defining a shaft axis and having a first end and a second end, the first end having an insertion portion configured to be inserted into a trailer-hitch-like receptacle;
    (b) an indentation structure coupled to the second end of the main shaft, the indentation structure forming an indentation having interior surfaces that (i) extend upwardly and away from the main shaft and (ii) are configured to exert upward force on the piece of wood when received in the jaw apparatus; and
    (c) two or more bars coupled to the main shaft at a bar connection location between the first and second ends of the main shaft, each of the two or more bars (i) extending upwardly and away from the main shaft in a direction toward the second end of the main shaft and (ii) having a downward facing surface configured to exert downward force on the piece of wood when received in the jaw apparatus, wherein at least two of the two or more bars are both generally straight and extend generally parallel to one another.

2. The jaw apparatus of claim 1, wherein the bar connection location and the insertion portion are adjacent one another.

3. The jaw apparatus of claim 1, wherein the interior surfaces of the indentation structure's indentation include teeth configured to grip the piece of wood when received in the jaw apparatus, and wherein each of the downward facing surface (s) of the two or more bars include teeth configured to grip the piece of wood when received in the jaw apparatus.

4. The jaw apparatus of claim 1, wherein the indentation structure comprises first and second arms that are generally straight and that both extend upwardly and away from the main shaft to form a V-shaped indentation.

5. The jaw apparatus of claim 1, wherein the indentation structure extends in a generally radial direction relative to the shaft axis.

6. The jaw apparatus of claim 1, wherein each bar includes an attachment end and a free end, the jaw apparatus further comprising
    (d) a nut-and-bolt combination connecting the at least two bars of the two or more bars near their free ends and (e) a spacer carried by the nut-and-bolt combination, the spacer contacting both bars to inhibit the bars from moving toward one another.

7. The jaw apparatus of claim 6, wherein the spacer and the nut-and-bolt combination form a handle adapted to permit generally weight-balanced carrying of the jaw apparatus.

8. The jaw apparatus of claim 1, wherein the bars are a distance apart from one another and each bar includes an attachment end and a free end, the jaw apparatus further comprising
  (d) a nut-and-bolt combination connecting the at least two bars of the two or more bars near their attachment ends, the nut-and-bolt combination being configured to apply downward force on pieces of wood that are smaller than the distance between the at least two bars.

9. The jaw apparatus of claim 1, wherein the at least two bars of the two or more bars each form an angle between 15 and 75 degrees with the shaft axis.

10. The jaw apparatus of claim 1, wherein the downward facing surface(s) of the two or more bars form a continuously variable gripper adapted to receive and hold pieces of wood having cross-sectional vertical dimensions between 1 and 10 inches without adjustment of the two or more bars.

11. A method of cutting a piece of wood, the method comprising:
  (a) providing a jaw apparatus that includes:
    (i) a generally straight main shaft defining a shaft axis and having a first end and a second end, the first end having an insertion portion,
    (ii) an indentation structure coupled to the second end of the main shaft, the indentation structure forming an indentation having interior surfaces that extend upwardly and away from the main shaft, and
    (iii) two or more bars coupled to the main shaft at a bar connection location between the first and second ends of the main shaft, each of the two or more bars extending upwardly and away from the main shaft in a direction toward the second end of the main shaft, wherein at least two of the two or more bars are both generally straight and extend generally parallel to one another;
  (b) inserting the insertion portion of the jaw apparatus into a trailer-hitch-like receptacle that is affixed to an anchor;
  (c) securing the piece of wood in the jaw apparatus such that
    (i) the interior surfaces of the indentation structure's indentation exert upward force on the piece of wood,
    (ii) a downward facing surface of each of the two or more bars exerts downward force on the piece of wood, and
    (iii) a free end of the piece of wood extends beyond the second end of the main shaft; and
  (d) cutting the piece of wood between the free end of the piece of wood and the second end of the main shaft.

12. The method of claim 11, wherein the piece of wood is a piece of dimensional lumber.

13. The method of claim 11, wherein the trailer-hitch-like receptacle is a trailer hitch receptacle and the anchor is a vehicle.

14. The method of claim 11, wherein each bar includes an attachment end and a free end, the jaw apparatus further including (iv) a nut-and-bolt combination connecting the at least two bars of the two or more bars near their free ends and (v) a spacer carried by the nut-and-bolt combination, the spacer contacting both bars to inhibit the bars from moving toward one another.

15. The method of claim 14, further comprising:
  (e) carrying the jaw apparatus by the spacer and nut-and-bolt combination before inserting the insertion portion of the jaw apparatus into the trailer-hitch-like receptacle.

16. A kit for assembling a jaw apparatus that is adapted to receive and hold a piece of wood to assist a user in cutting the piece of wood, the kit including:
  (a) a main shaft defining a shaft axis and having a first end and a second end, the first end having an insertion portion configured to be inserted into a trailer-hitch-like receptacle;
  (b) an indentation structure adapted to be coupled to the second end of the main shaft such that, when so coupled, the indentation structure forms an indentation having interior surfaces that (i) extend upwardly and away from the main shaft and (ii) are configured to exert upward force on the piece of wood when received in the jaw apparatus;
  (c) two or more bars adapted to be coupled to the main shaft at a bar connection location between the first and second ends of the main shaft such that, when so coupled, each of the two or more bars (i) extend upwardly and away from the main shaft in a direction toward the second end of the main shaft and (ii) have a downward facing surface configured to exert downward force on the piece of wood when received in the jaw apparatus, wherein at least two of the two or more bars are both generally straight and extend generally parallel to one another; and
  (d) instructions for coupling the indentation structure and the two or more bars to the main shaft to form the jaw apparatus.

17. The kit of claim 16, further comprising (e) a package for enclosing the main shaft, the indentation structure, the two or more bars, and the instructions, wherein the package is smaller than 350 cubic inches.

18. The kit of claim 16, wherein the main shaft, the indentation structure, the two or more bars, and the instructions weigh less than 25 pounds combined.

* * * * *